United States Patent
Motonaga

(10) Patent No.: US 11,079,336 B2
(45) Date of Patent: Aug. 3, 2021

(54) SEMICONDUCTOR INSPECTION APPARATUS AND SEMICONDUCTOR DEVICE INSPECTION METHOD

(71) Applicants: Kabushiki Kaisha Toshiba, Tokyo (JP); Toshiba Electronic Devices & Storage Corporation, Tokyo (JP)

(72) Inventor: Ikuo Motonaga, Ibo Hyogo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/808,639

(22) Filed: Mar. 4, 2020

(65) Prior Publication Data

US 2021/0080404 A1 Mar. 18, 2021

(30) Foreign Application Priority Data

Sep. 13, 2019 (JP) .............................. JP2019-167626

(51) Int. Cl.
*G01N 21/95* (2006.01)
*G06T 7/00* (2017.01)

(52) U.S. Cl.
CPC ....... *G01N 21/9501* (2013.01); *G06T 7/0004* (2013.01); *G06T 2207/30148* (2013.01)

(58) Field of Classification Search
CPC .............. G01N 21/9501; G06T 7/0004; G06T 2207/30148

See application file for complete search history.

(56) References Cited

U.S. PATENT DOCUMENTS 5,995,220 A * 11/1999 Suzuki ............ G01N 21/95684
348/126

FOREIGN PATENT DOCUMENTS

| JP | H07-055442 A | 3/1995 |
| JP | 2894876 B2 | 5/1999 |
| JP | 6461555 B2 | 1/2019 |

* cited by examiner

*Primary Examiner* — Jamil Ahmed

(74) *Attorney, Agent, or Firm* — White & Case LLP

(57) ABSTRACT

A semiconductor inspection apparatus of embodiments includes: a light source irradiating a semiconductor package, the semiconductor package including: a sealing portion having an upper surface, a lower surface, a first side surface, and a second side surface; and a first lead extending from the first side surface, the first lead having a first wide width portion and a first narrow width portion, the first wide width portion being between the first side surface and the first narrow width portion; an imaging device capturing a first image of the first lead; a first calculator calculating a first area of a first notch region located on one side of the first narrow width portion and a second area of a second notch region located on the other side of the first narrow width portion; and a second calculator calculating a ratio of the first area and the second area.

8 Claims, 7 Drawing Sheets

SEMICONDUCTOR INSPECTION APPARATUS AND SEMICONDUCTOR DEVICE INSPECTION METHOD

CROSS-REFERENCE TO RELATED APPLICATION

This application is based upon and claims the benefit of priority from Japanese Patent Application No. 2019-167626, filed on Sep. 13, 2019, the entire contents of which are incorporated herein by reference.

FIELD

Embodiments described herein relate generally to a semiconductor inspection apparatus and a semiconductor device inspection method.

BACKGROUND

In order to improve bonding characteristics between a lead of a semiconductor package and a circuit board, there is a so-called wettable flank structure where a notch region is provided in the distal end portion of the lead. In the wettable flank structure, the notch region is provided in the distal end portion of the lead, solder wettability of the distal end portion of the lead is improved. By improving the solder wettability of the distal end portion of the lead, the bonding characteristics of the solder bonding are improved. In order to realize the stable bonding characteristics, the shape of the notch region is required to be formed into a desired shape. Accordingly, in visual inspection of the semiconductor package, an inspection apparatus capable of appropriately managing the shape of the notch region of the distal end portion of the lead is required.

DETAILED DESCRIPTION

Figure 1:
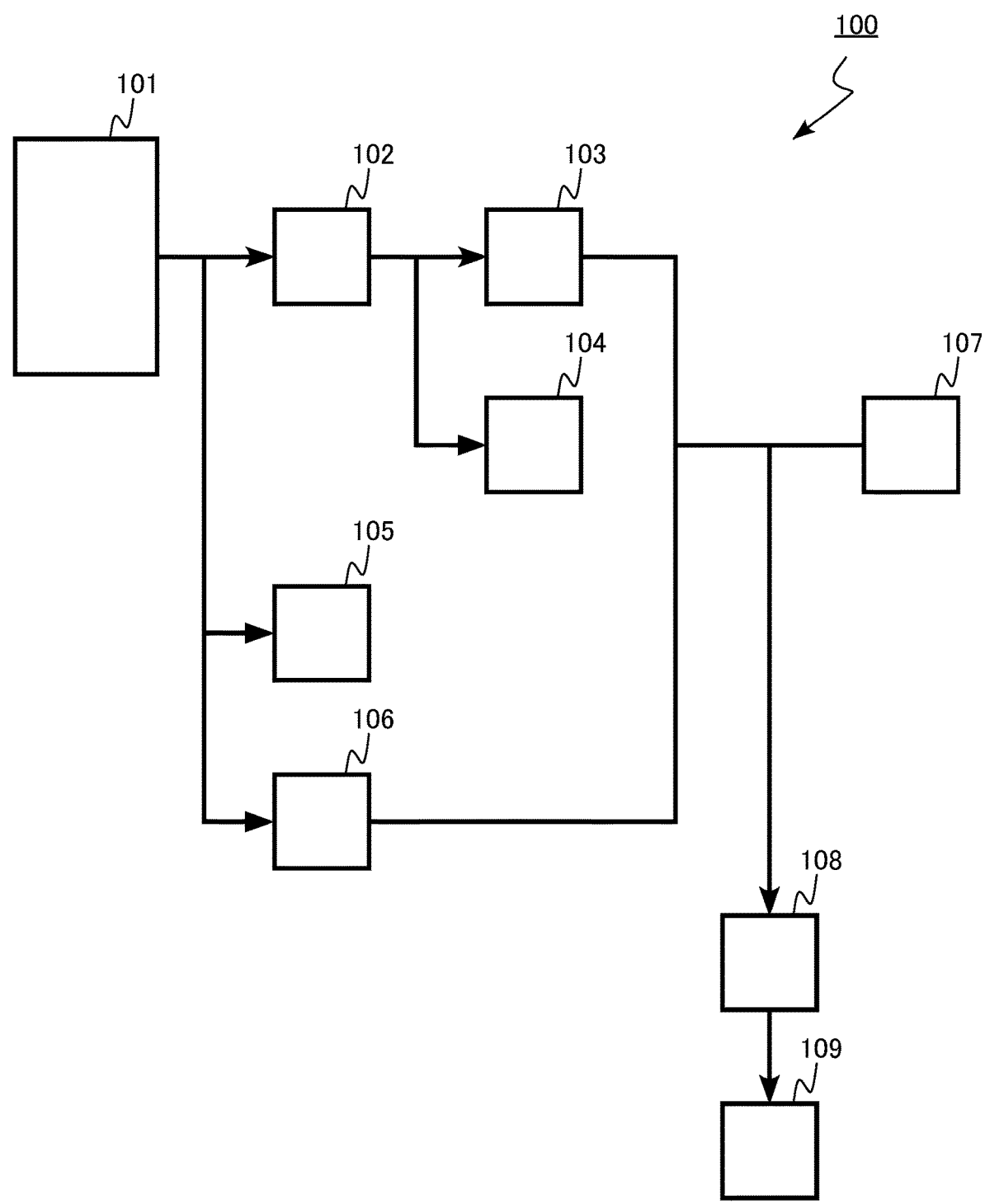
FIG. 1 is a block diagram of a semiconductor inspection apparatus of an embodiment.

According to an aspect of the invention, there is provided a semiconductor inspection apparatus including: a light source irradiating a semiconductor package with inspection light, the semiconductor package including: a sealing portion having an upper surface, a lower surface, a first side surface, and a second side surface facing the first side surface, the sealing portion sealing a semiconductor chip; and a first lead extending from the first side surface of the sealing portion in a first direction, the first lead having a first wide width portion and a first narrow width portion, the first wide width portion being located between the first side surface and the first narrow width portion; an imaging device capturing a first image of the first lead, the semiconductor package being interposed between the imaging device and the light source; a first calculator calculating a first area of a first notch region located on one side of the first narrow width portion of the first lead and a second area of a second notch region located on the other side of the first narrow width portion from the first image; and a second calculator calculating a ratio of the first area and the second area.

In this specification, in some cases, the same or similar members are denoted by the same reference numerals, and redundant description is omitted.

A semiconductor inspection apparatus of an embodiment includes: a light source irradiating a semiconductor package with inspection light, the semiconductor package including: a sealing portion having an upper surface, a lower surface, a first side surface, and a second side surface facing the first side surface, the sealing portion sealing a semiconductor chip; and a first lead extending from the first side surface of the sealing portion in a first direction, the first lead having a first wide width portion and a first narrow width portion, the first wide width portion being located between the first side surface and the first narrow width portion; an imaging device capturing a first image of the first lead, the semiconductor package being interposed between the imaging device and the light source; a first calculator calculating a first area of a first notch region located on one side of the first narrow width portion of the first lead and a second area of a second notch region located on the other side of the first narrow width portion from the first image; and a second calculator calculating a ratio of the first area and the second area.

The semiconductor inspection apparatus of the embodiment is used for visual inspection of the semiconductor package, particularly, visual inspection of the lead having a wettable flank structure.

FIG. 1 is a block diagram of a semiconductor inspection apparatus of the embodiment.

The semiconductor inspection apparatus 100 of the embodiment includes an imaging unit 101, a first calculator 102, a second calculator 103, a third calculator 104, a fourth calculator 105, a fifth calculator 106, a storage unit 107 (storage device), a determination unit 108, and, an output unit 109. The imaging unit 101, the first calculator 102, the second calculator 103, the third calculator 104, the fourth calculator 105, the fifth calculator 106, the storage unit 107, the determination unit 108, and the output unit 109 are connected to each other in a wired or wireless manner to transmit information in a bi-directional or one-directional manner.

Figure 2A:
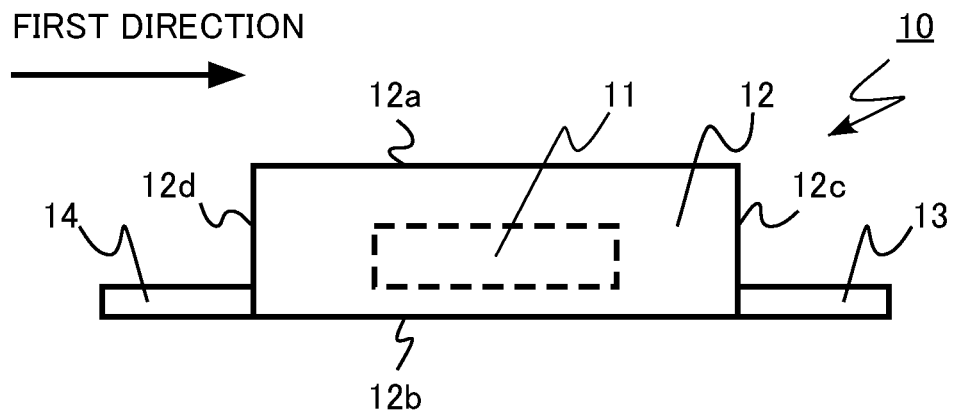
FIGS. 2A and 2B are schematic views of a semiconductor package to be inspected of the embodiment.
Figure 2B:
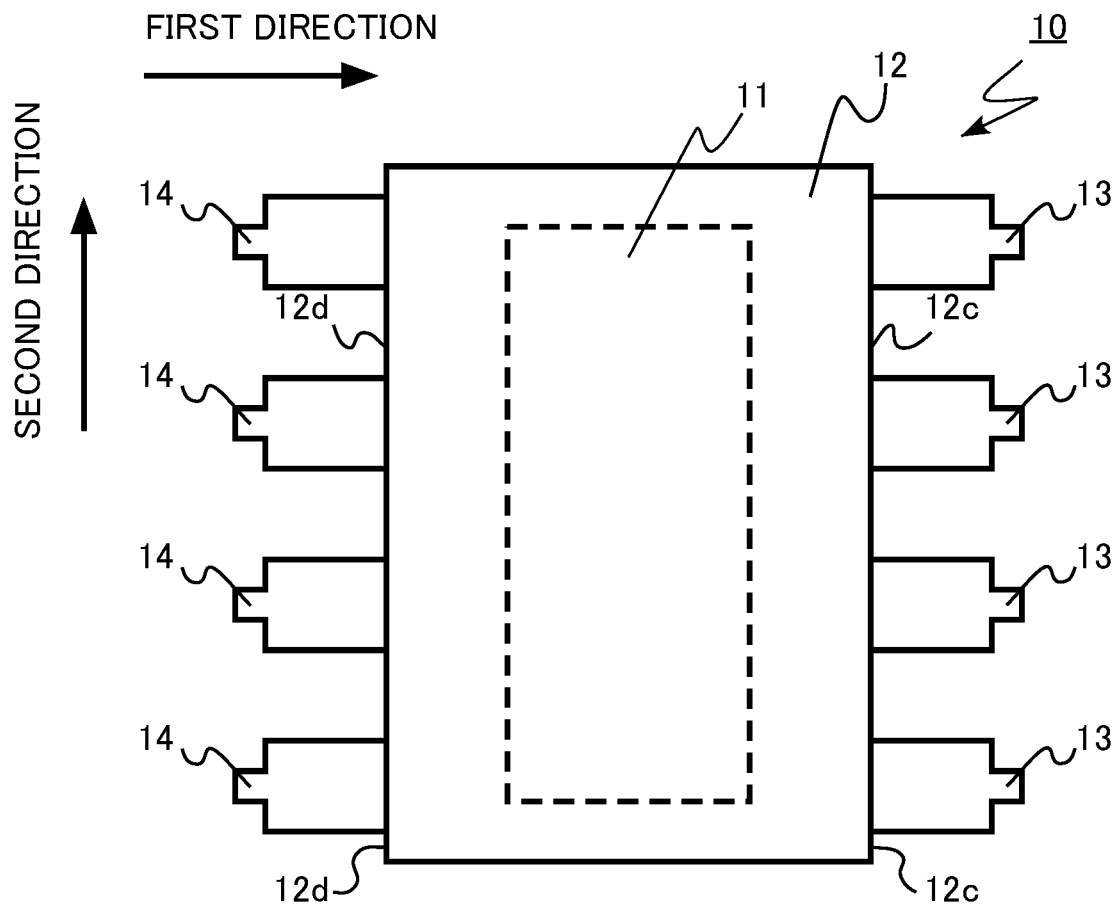

FIGS. 2A and 2B are schematic views of a semiconductor package to be inspected of the embodiment. FIG. 2A is a side view, and FIG. 2B is a top view.

The semiconductor package 10 includes a semiconductor chip 11, a sealing portion 12, a plurality of first leads 13, and a plurality of second leads 14.

The semiconductor chip 11 is, for example, a transistor or diode using semiconductor.

The sealing portion 12 has an upper surface 12a, a lower surface 12b, a first side surface 12c, and a second side surface 12d. The lower surface 12b faces the upper surface 12a. The second side surface 12d faces the first side surface 12c.

The sealing portion 12 seals the semiconductor chip 11. The sealing portion 12 surrounds the semiconductor chip 11. The sealing portion 12 is made of, for example, a resin. The sealing portion 12 is made of, for example, an epoxy resin.

The first leads 13 extend laterally from the first side surface 12c of the sealing portion 12. The first leads 13 extend in the first direction. The first leads 13 are arranged side by side in the second direction.

The second leads 14 extend laterally from the second side surface 12d of the sealing portion 12. The second leads 14 extend in the direction opposite to the first direction. The second leads 14 are arranged side by side in the second direction.

Figure 3A:
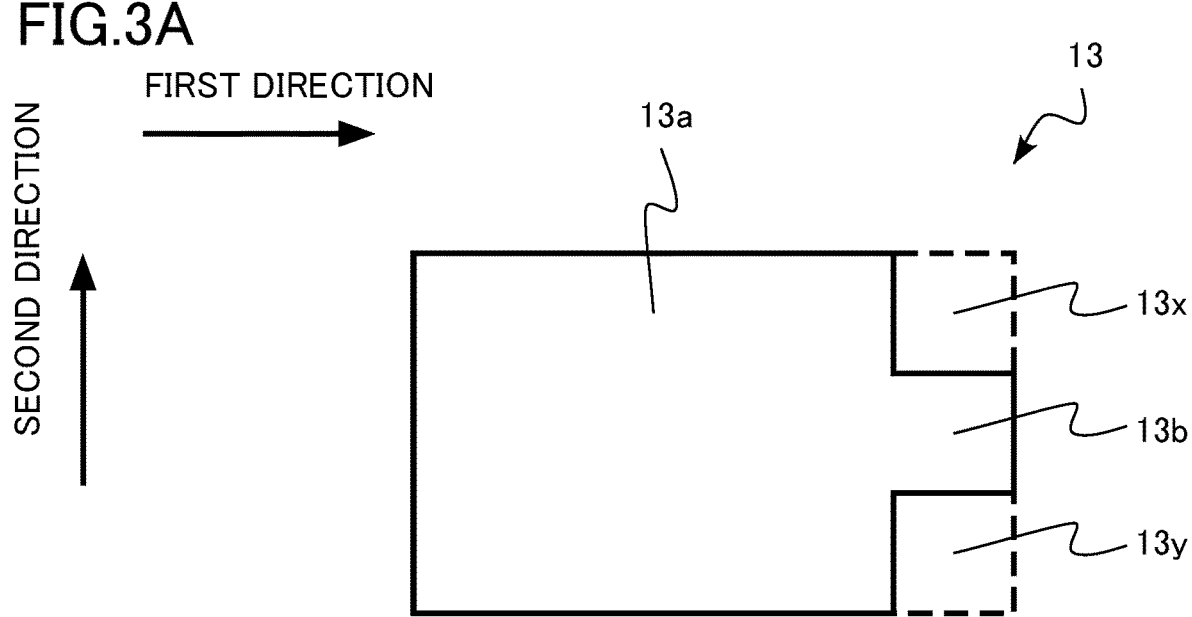
FIGS. 3A and 3B are enlarged top views of a first lead and a second lead of the embodiment.
Figure 3B:
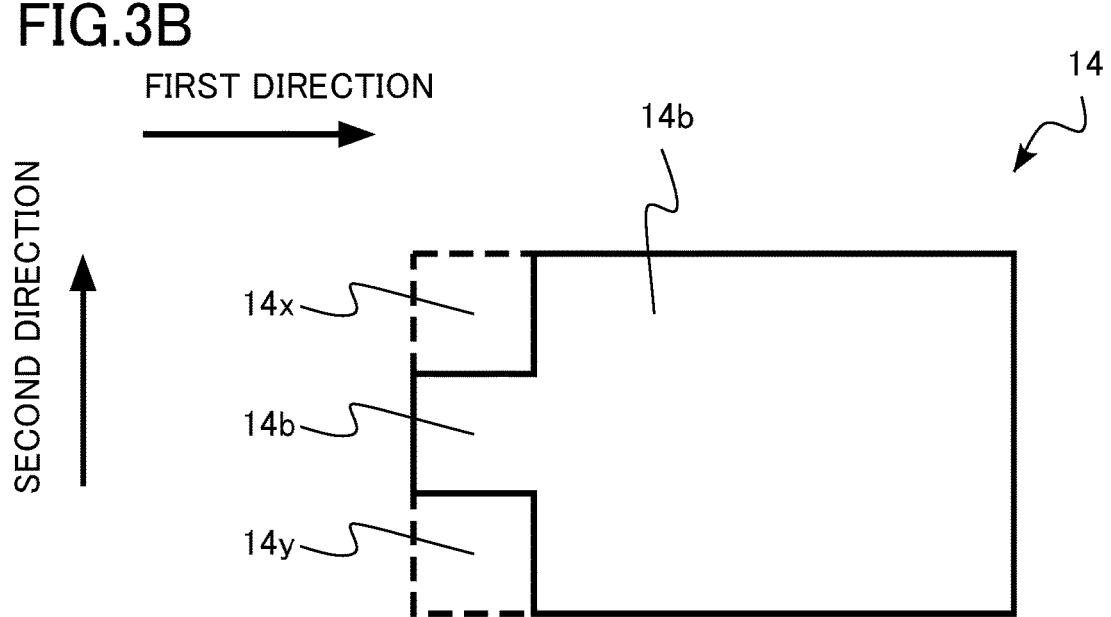

FIGS. 3A and 3B are enlarged top views of the first lead and the second lead in the embodiment. FIG. 3A is a top view of the first lead 13, and FIG. 3B is a top view of the second lead 14.

The first lead 13 has a wide width portion 13a (first wide width portion) and a narrow width portion 13b (first narrow width portion). The wide width portion 13a is located between the narrow width portion 13b and the first side surface 12c. The narrow width portion 13b is located at the distal end portion of the first lead 13.

The first lead 13 has a notch region 13x (first notch region) and a notch region 13y (second notch region). The notch region 13x is located on one side of the narrow width portion 13b. The notch region 13y is located on the other side of the narrow width portion 13b. The notch region 13x is located in the second direction of the narrow width portion 13b. The notch region 13y is located in the direction opposite to the second direction of the narrow width portion 13b. The first lead 13 has notch regions on the left and right of the distal end portion.

The notch regions 13x and the notch regions 13y are regions cut out when processing the first lead 13 in a mold.

The first lead 13 has a so-called wettable flank structure. When mounting the semiconductor package 10 to a circuit board with solder-bonding, the solder fillet is formed in the notch region 13x and the notch region 13y of the first lead 13, so that the bonding characteristics of the solder bonding is improved.

The second lead 14 has a wide width portion 14a (second wide width portion) and a narrow width portion 14b (second narrow width portion). The wide width portion 14a is located between the narrow width portion 14b and the second side surface 12d. The narrow width portion 14b is located at the distal end portion of the second lead 14.

The second lead 14 has a notch region 14x (third notch region) and a notch region 14y (fourth notch region). The notch region 14x is located on one side of the narrow width portion 14b. The notch region 14y is located on the other side of the narrow width portion 14b. The notch region 14x is located in the second direction of the narrow width portion 13b. The notch region 14y is located in the direction opposite to the second direction of the narrow width portion 14b. The second lead 14 has notch regions on the left and right of the distal end portion.

The notch regions 14x and the notch regions 14y are regions cut out when processing the second lead 14 in a mold.

Similarly to the first lead 13, the second lead 14 has a so-called wettable flank structure.

Figure 4:
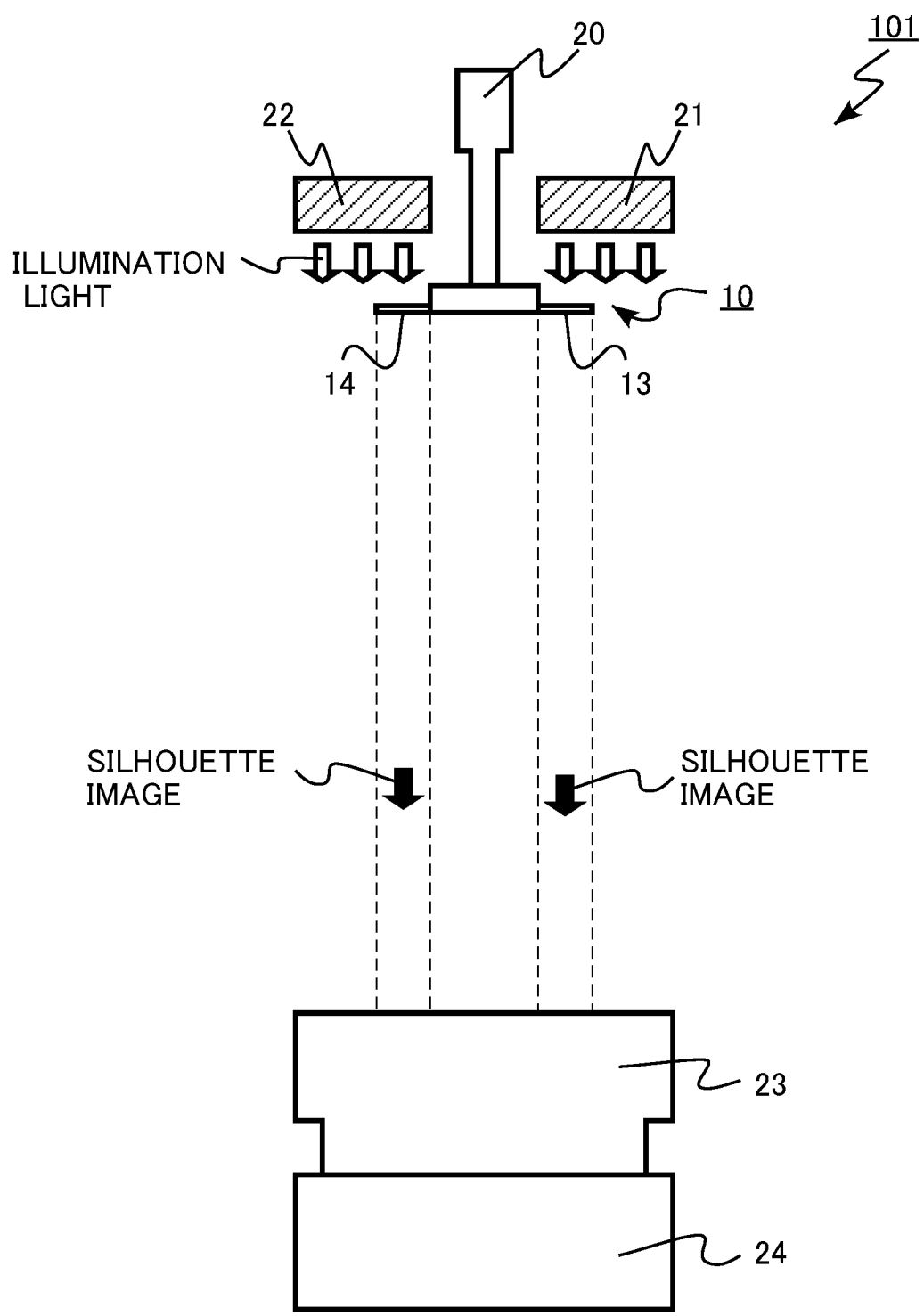
FIG. 4 is a schematic view of an imaging unit of the embodiment.

FIG. 4 is a schematic view of the imaging unit of the embodiment. The imaging unit 101 includes a collet 20, a light source 21, and a light source 22, lens 23, and a CCD camera 24 (imaging device).

The imaging unit 101 captures an image of the first lead 13 from the direction perpendicular to the upper surface 12a and lower surface 12b of the semiconductor package 10. In FIG. 4, for example, the upper surface 12a is the surface of the upper side of the semiconductor package 10, and the lower surface 12b is the surface of the lower side of the r semiconductor package 10.

The semiconductor package 10 is adsorbed and supported to the collet 20.

The light source 21 is provided on the side of the upper surface 12a and the side of the first side surface 12c of the semiconductor package 10. In FIG. 4, the first side surface 12c is the side surface on the right side of the semiconductor package 10. The light source 21 irradiates the first lead 13 with illumination light. The illumination light is the inspection light.

The light source 22 is provided on the side of the upper surface 12a and on the side of the second side surface 12d of the semiconductor package 10. In FIG. 4, the second side surface 12d is the side surface of the left side of the semiconductor package 10. The light source 22 irradiates the second lead 14 with illumination light. The illumination light is the inspection light.

The light source 21 and the light source 22 are, for example, a white light emitting diode. The light source 21 and the light source 22 are a backlight.

The lens 23 magnifies a silhouette image of the first lead 13 that is illuminated by the light source 21. In addition, the lens 23 magnifies a silhouette image of the second lead 14 that is illuminated by the light source 22.

The CCD camera 24 is provided between the light source 21 and the light source 22 with the semiconductor package 10 interposed. The CCD camera 24 captures the silhouette image (first image) of the first lead 13 that is magnified by the lens 23. In addition, the CCD camera 24 captures the silhouette image (second image) of the second lead 14 that is magnified by the lens 23. For example, the CCD camera 24 simultaneously captures the silhouette image of the first lead 13 and the silhouette image of the second lead 14.

Figure 5A:
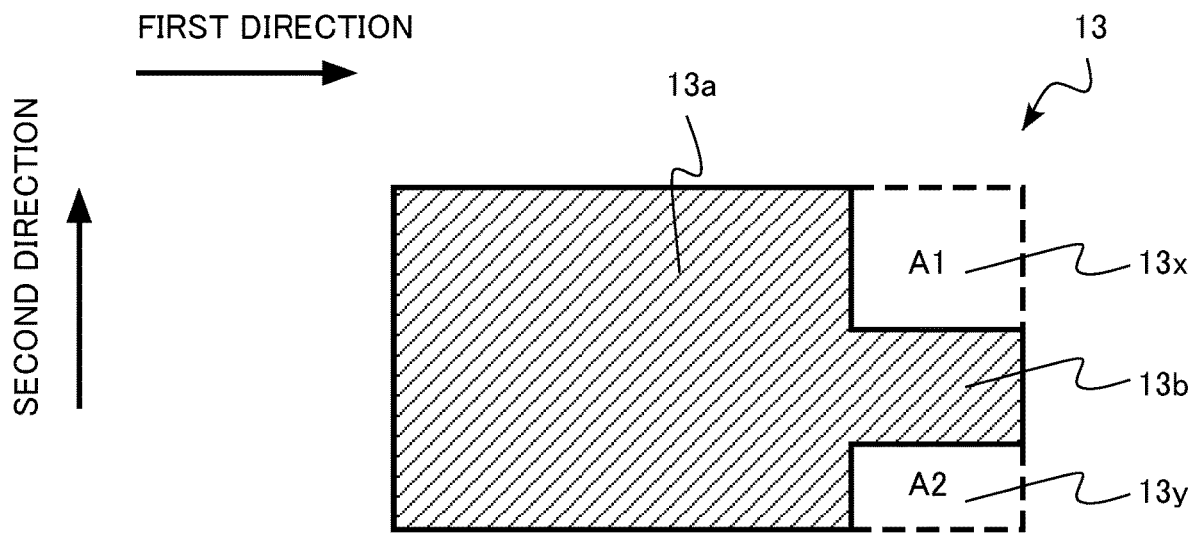
FIGS. 5A and 5B are schematic views of examples of the image captured by the imaging unit of the embodiment.
Figure 5B:
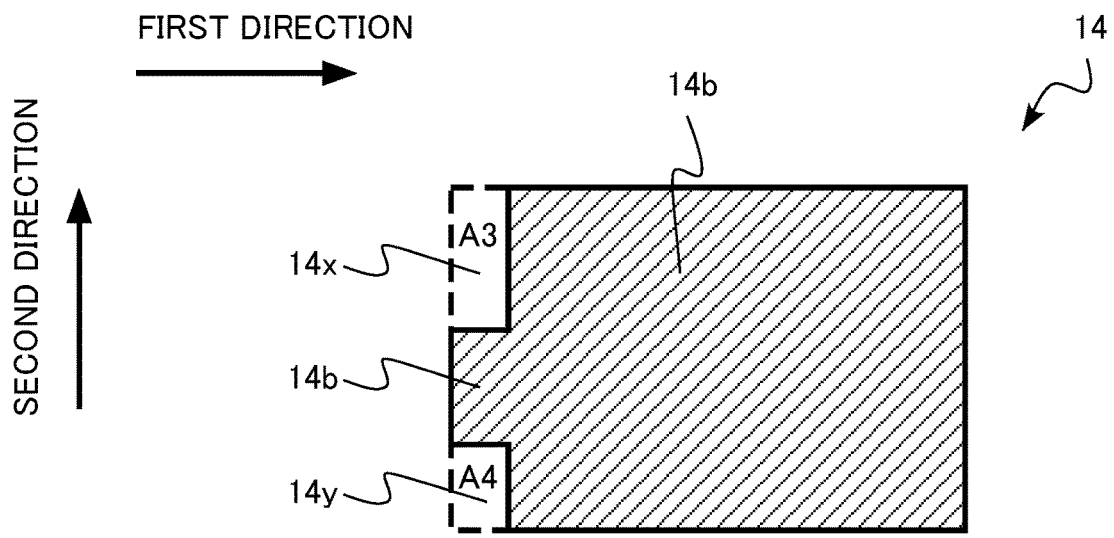

FIGS. 5A and 5B are schematic diagrams of examples of images captured by the imaging unit of the embodiment. FIG. 5A is an example of the silhouette image of the first lead 13. FIG. 5B is an example of the silhouette image of the second lead 14.

The first calculator 102 calculates a first area A1 of the notch region 13x (first notch region) from the silhouette image of the first lead 13 captured by the imaging unit 101. In addition, the first calculator 102 calculates a second area A2 of the notch region 13y (second notch region) from the silhouette image of the first lead 13.

In addition, the first calculator 102 calculates a third area A3 of the notch region 14x (third notch region) from the silhouette image (second image) of the second lead 14 captured by the imaging unit 101. In addition, the first calculator 102 calculates a fourth area A4 of the notch region 14y (fourth notch region) from the silhouette image of the second lead 14.

The second calculator 103 calculates a first ratio (A1/A2) of the first area A1 and the second area A2 from the first area A1 and the second area A2 calculated by the first calculator 102. In addition, the second calculator 103 calculates a second ratio (A3/A4) of the third area A3 and the fourth area A4 from the third area A3 and the fourth area A4 calculated by the first calculator 102.

The third calculator 104 calculates a first sum S1=A1+A2 of the first area A1 and the second area A2. In addition, the third calculator 104 calculates a second sum S2=A3+A4 of the third area A3 and the fourth area A4. The third calculator 104 further calculates a third ratio (S1/S2) of the first sum S1 and the second sum S2.

Figure 6A:
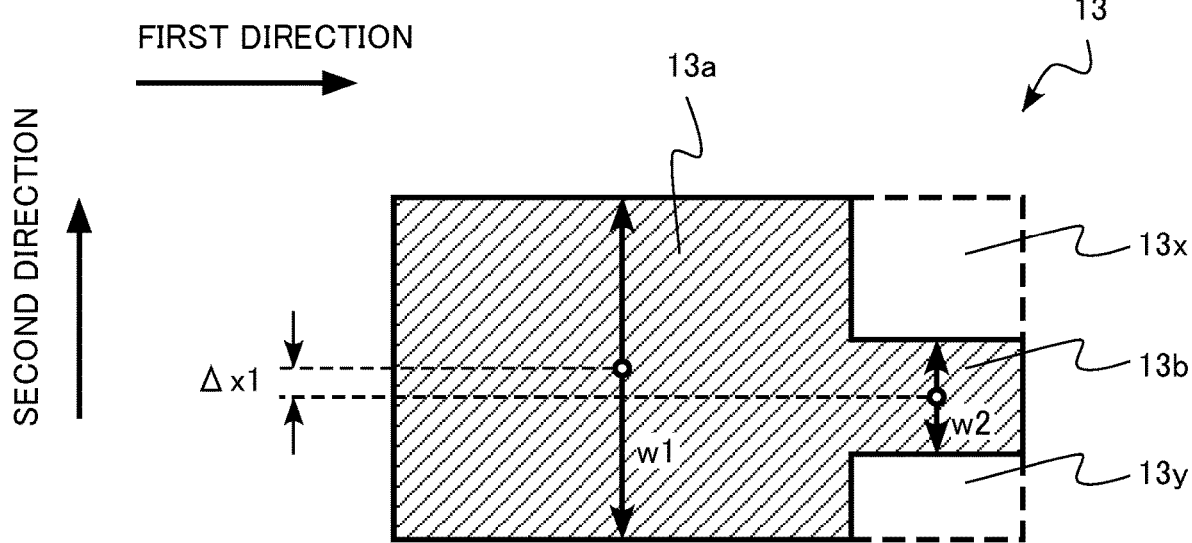
FIGS. 6A and 6B are schematic views of examples of an image captured by the imaging unit of the embodiment.
Figure 6B:
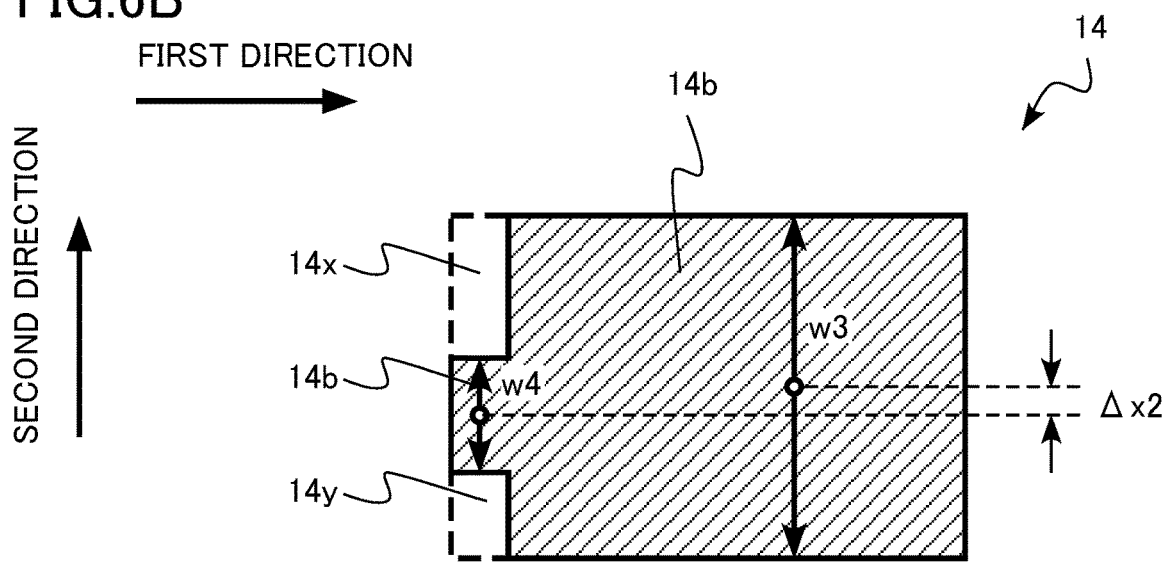

FIGS. 6A and 6B are schematic views of an example of an image captured by the imaging unit of the embodiment. FIG. 6A is an example of the silhouette image of the first lead 13. FIG. 6B is an example of the silhouette image of the second lead 14.

The fourth calculator 105 calculates a first width w1 of the wide width portion 13a (first wide width portions) in the second direction and a second width w2 of the narrow width portion 13b (first narrow width portion) in the second direction from the silhouette image of the first lead 13 that is captured by the imaging unit 101. In addition, the fourth calculator 105 calculates a third width w3 of the wide width portion 14a (third wide width portion) in the second direction and a fourth width w4 of the narrow width portion 14b (third narrow width portion) in the second direction from the silhouette image of the second lead 14 that is captured by the imaging unit 101.

In addition, the fourth calculator 105 calculates a first deviation amount Δx1 of the wide width portion 13a and the narrow width portion 13b in the second direction from the silhouette image of the first lead 13. In addition, the fourth calculator 105 calculates a second deviation amount Δx2 of the wide width portion 14a and the narrow width portion 14b in the second direction from the silhouette image of the second lead 14.

Figure 7A:
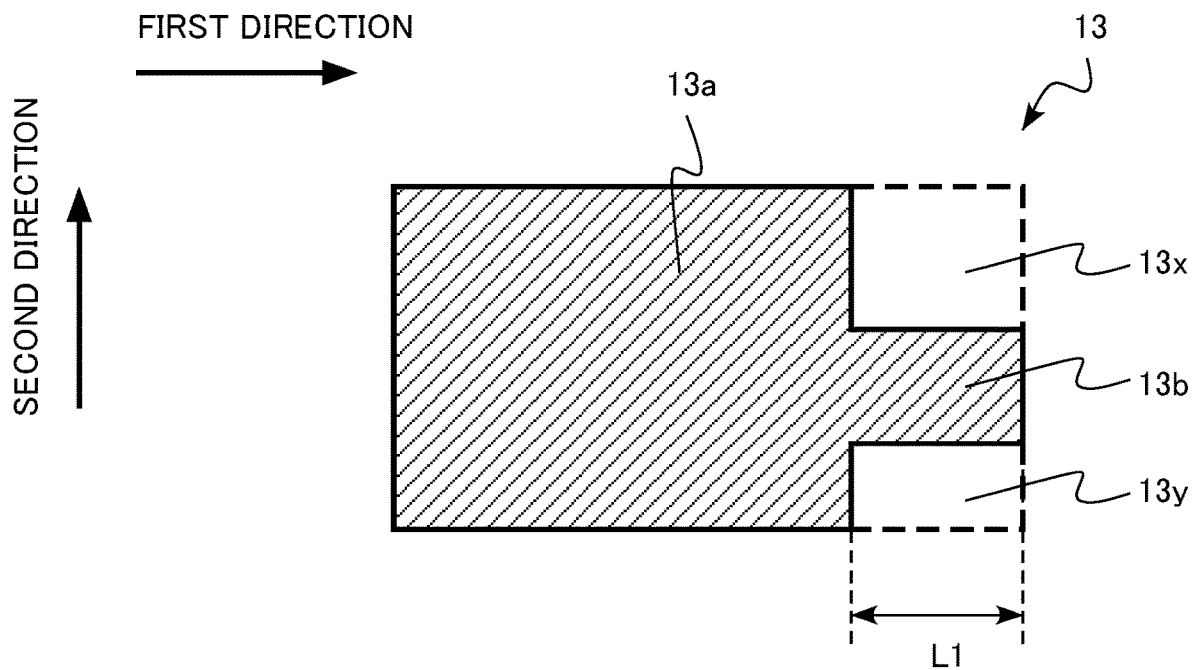
FIGS. 7A and 7B are schematic views of examples of an image captured by the imaging unit of the embodiment.
Figure 7B:
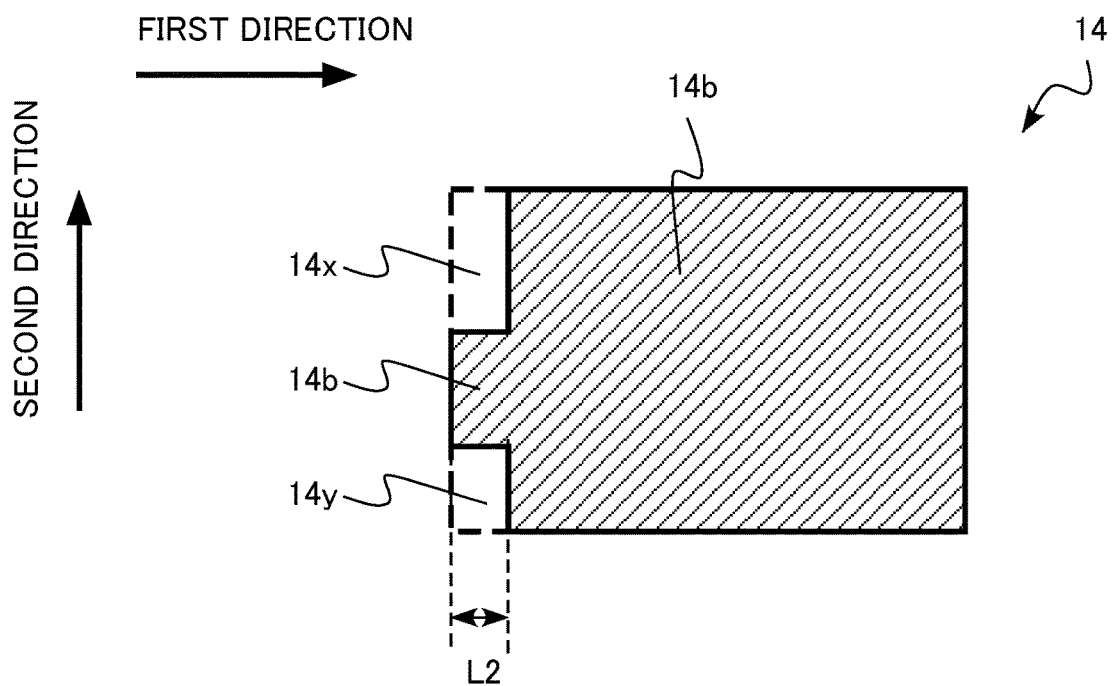

FIGS. 7A and 7B are schematic diagrams of examples of images captured by the imaging unit of the embodiment. FIG. 7A is an example of the silhouette image of the first lead 13. FIG. 7B is an example of the silhouette image of the second lead 14.

The fifth calculator 106 calculates a first length L1 of the narrow width portion 13b (first narrow width portion) in the first direction from the silhouette image of the first lead 13 captured by the imaging unit 101. In addition, the fifth calculator 106 calculates a second length L2 of the narrow width portion 14b (third narrow width portion) in the first direction from the silhouette image of the second lead 14 captured by the imaging unit 101.

The first calculator 102, the second calculator 103, the third calculator 104, the fourth calculator 105, and the fifth calculator 106 are configured with, for example, a combination of hardware and software.

The storage unit 107 stores calculation results calculated by, for example, the first calculator 102, the second calculator 103, the third calculator 104, the fourth calculator 105, and the fifth calculator 106. In addition, the storage unit 107 stores threshold values for determining good or bad qualities of the calculation results calculated by, for example, the first calculator 102, the second calculator 103, the third calculator 104, the fourth calculator 105, and the fifth calculator 106. The storage unit 107 is, for example, a semiconductor memory.

The determination unit 108 determines good or bad quality of the semiconductor package 10 by comparing the calculation results calculated by the first calculator 102, the second calculator 103, the third calculator 104, the fourth calculator 105, and the fifth calculator 106 with the predetermined threshold stored in the storage unit 107. In a case where the calculation results calculated by the first calculator 102, the second calculator 103, the third calculator 104, the fourth calculator 105, and the fifth calculator 106 are outside the predetermined threshold value stored in the storage unit 107, the determination unit 108 determines that the semiconductor package 10 is defective product.

The determination unit 108 is configured with, for example, a combination of hardware and software.

The output unit 109 outputs, for example, the calculation results calculated by the first calculator 102, the second calculator 103, the third calculator 104, the fourth calculator 105, and the fifth calculator 106. The output unit 109 outputs, for example, the determination result of the determination unit 108. The output unit 109 is, for example, a liquid crystal screen. The output unit 109 is, for example, a printer.

Next, a semiconductor device inspection method of the embodiment will be described.

The semiconductor device inspection method of the embodiment includes: capturing a first image of a first lead of a semiconductor package, the semiconductor package including: a sealing portion having an upper surface, a lower surface, a first side surface, and a second side surface facing the first side surface, the sealing portion sealing a semiconductor chip; and a first lead extending from the first side surface of the sealing portion in a first direction, the first lead having a first wide width portion and a first narrow width portion, the first wide width portion being located between the first side surface and the first narrow width portion; calculating a first area of a first notch region located on one side of the first narrow width portion of the first lead and a second area of a second notch region located on the other side of the first narrow width portion from the first image; and calculating a ratio of the first area and the second area.

The semiconductor device inspection method of the embodiment is a method of visual inspection of the semiconductor package, particularly a method of visual inspection of a lead having a wettable flank structure.

The semiconductor device inspection method of the embodiment uses the semiconductor inspection apparatus 100 illustrated in FIG. 1.

First, the semiconductor package 10 is adsorbed and supported to the collet 20 of the semiconductor inspection apparatus 100. Next, the semiconductor package 10 is irradiated with the inspection light from the light source 21 and the light source 22.

The silhouette image (first image) of the first lead 13 and the second silhouette image (second image) are captured by the CCD camera 24.

Next, the first area A1 of the notch region 13x (first notch region) and the second area A2 of the notch region 13y (second notch region) are calculated from the silhouette image of the first lead 13. In addition, the third area A3 of the notch region 14x (third notch region) and the fourth area A4 of the notch region 14y (fourth notch region) are calculated from the silhouette image of the second lead 14. The first area A1, the second area A2, the third area A3, and the fourth area A4 are calculated by the first calculator 102.

Next, the first ratio (A1/A2) of the first area A1 and the second area A2 is calculated. In addition, the second ratio (A3/A4) of the third area A3 and the fourth area A4 is calculated. The first ratio (A1/A2) and the second ratio (A3/A4) are calculated by the second calculator 103.

Next, the first sum S1 of the first area A1 and the second area A2 and the second sum S2 of the third area A3 and the fourth area A4 are calculated. Furthermore, the third ratio (S1/S2) of the first sum S1 and the second sum S2 is calculated. The first sum S1, the second sum S2, and the third ratio (S1/S2) are calculated by the third calculator 104.

Next, the first width w1 of the wide width portion 13a (first wide width portion) in the second direction and the second width w2 of the narrow width portion 13b (first narrow width portion) in the second direction are calculated from the silhouette image of the first lead 13. In addition, the third width w3 of the wide width portion 14a (third wide width portion) in the second direction and the fourth width w4 of the narrow width portion 14b (third narrow width portion) 2 in the second direction are calculated from the silhouette image of the second lead 14. The first width w1, the second width w2, the third width w3, and the fourth width w4 are calculated by the fourth calculator 105.

Next, the first length L1 of the narrow width portion 13b (first narrow width portion) in the first direction is calculated from the silhouette image of the first lead 13. In addition, the second length L2 of the narrow width portion 14b (third narrow width portion) in the first direction is calculated from the silhouette image of the second lead 14. The first length L1 and the second length L2 are calculated by the fifth calculator 106.

Then, the calculation results obtained from the silhouette image of the first lead 13 and the silhouette image of the second lead 14 is compared with a predetermined threshold value. In a case where the calculation result is out of the predetermined threshold value, it is determined that the semiconductor package 10 is a defective product. The comparison of the calculation results with the predetermined threshold value and the determination of whether or not the semiconductor package 10 is a defective product are performed by the determination unit 108.

For example, in a case where the first ratio (A1/A2) or the second ratio (A3/A4) is not in the range of 0.7 or more and 1.3 or less, it is determined that the semiconductor package 10 is a defective product. In addition, for example, in a case where the third ratio (S1/S2) is not in the range of 0.7 or more and 1.3 or less, it is determined that the semiconductor package 10 is a defective product.

Then, the calculation results obtained from the silhouette image of the first lead 13 and the silhouette image of the second lead 14 or the determination result of whether or not the semiconductor package 10 is a defective product are output. The calculation results or the determination results are output from the output unit 109.

Next, the functions and effects of the semiconductor inspection apparatus and the semiconductor device inspection method of the embodiment will be described.

With respect to the semiconductor package having a wettable flank structure, in order to realize stable bonding characteristics, the shape of the notch region in the distal end portion of the lead is required to be formed into a desired shape. In a case where the shape of the notch region of the lead is not formed into a desired shape due to, for example, processing variation of the lead, the solder wettability of the notch region varies. For this reason, a fillet having a desired shape is not formed in the notch region of the lead. Accordingly, in mounting the semiconductor package on a printed wiring board or the like, there is a problem of the occurrence of connection failure. Therefore, an inspection apparatus and an inspection method capable of performing proper management by accurately measuring the shape of the notch region of the distal end portion of the lead are required.

The notch region of the distal end portion of the lead is a fine area recessed from the lead. If the fine area is not sufficiently irradiated with the inspection light, the shape of the notch region cannot be accurately measured. In the semiconductor inspection apparatus of the embodiment, the inspection is performed by using the silhouette image of the lead. By using the so-called backlight, the fine notch region is sufficiently irradiated with the inspection light. Therefore, it is possible to accurately measure the shape of the notch region.

In addition, with respect to the semiconductor package having a wettable flank structure, in order to realize stable bonding characteristics, it is important to set the area balance of the notch regions to an appropriate value in addition to the lengths, widths, and the like of the leads. For example, it is important to set the area balance between the left and right of the notch regions of the distal end portion of the lead or the area balance of the notch regions between the leads to an appropriate value.

If the area balance between the left and right of the notch regions of the distal end portion of the lead or the area balance of the notch regions between the leads is lost, the balance of the fillet shape of the solder between the left and right of the lead and the fillet shape of the solder between the leads are lost. For this reason, at the time of mounting the semiconductor package on a printed wiring board or the like, connection failure is likely to occur. In addition, there is also a concern that bonding reliability failure occurs.

In the semiconductor inspection apparatus and the semiconductor device inspection method of the embodiment, for example, the first ratio (A1/A2) of the first area A1 and the second area A2 is calculated. In addition, the second ratio (A3/A4) of the third area A3 and the fourth area A4 is calculated. Then, it is determined whether or not the first ratio (A1/A2) or the second ratio (A3/A4) is out of a predetermined threshold value. Therefore, the balance of the notch regions between the right and left of the first lead 13 and the second lead 14 is appropriately managed.

In addition, in the semiconductor inspection apparatus and the semiconductor device inspection method of the embodiment, for example, the first sum S1 of the first area A1 and the second area A2 is calculated, the second sum S2 of the third area A3 and the fourth area A4 is calculated, and the third ratio (S1/S2) of the first sum S1 and the second sum S2 is calculated. Then, for example, it is determined whether or not the third ratio (S1/S2) is out of a predetermined threshold value. Accordingly, the area balance of the notch regions between the first lead 13 and the facing second lead 14 with the semiconductor chip 11 interposed is appropriately managed.

As described above, according to the semiconductor inspection apparatus and the semiconductor device inspection method of the embodiment, it is possible to appropriately manage the shape of the lead of the semiconductor package having a wettable flank structure.

While certain embodiments have been described, these embodiments have been presented by way of example only, and are not intended to limit the scope of the inventions. Indeed, a semiconductor inspection apparatus and a semiconductor device inspection method described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A semiconductor inspection apparatus comprising:
  a light source irradiating a semiconductor package with inspection light, the semiconductor package including:
    a sealing portion having an upper surface, a lower surface, a first side surface, and a second side surface facing the first side surface, the sealing portion sealing a semiconductor chip; and a first lead extending from the first side surface of the sealing portion in a first direction, the first lead having a first wide width portion and a first narrow width portion, the first wide width portion being located between the first side surface and the first narrow width portion;

an imaging device capturing a first image of the first lead, the semiconductor package being interposed between the imaging device and the light source;

a first calculator calculating a first area of a first notch region located on one side of the first narrow width portion of the first lead and a second area of a second notch region located on the other side of the first narrow width portion from the first image; and a second calculator calculating a ratio of the first area and the second area.

2. The semiconductor inspection apparatus according to claim 1, further comprising a third calculator, wherein the semiconductor package includes a second lead extending from the second side surface of the sealing portion in a direction opposite to the first direction, the second lead has a second wide width portion and a second narrow width portion, and the second wide width portion is located between the second side surface and the second narrow width portion, wherein the imaging device captures a second image of the second lead, wherein the first calculator calculates a third area of a third notch region located on one side of the second narrow width portion of the second lead and a fourth area of a fourth notch region located on the other side of the second narrow width portion from the second image, and wherein the third calculator calculates a first sum of the first area and the second area and a second sum of the third area and the fourth area and calculates a ratio of the first sum and the second sum.

3. The semiconductor inspection apparatus according to claim 1, further comprising a fourth calculator calculating a first width of the first wide width portion and a second width of the first narrow width portion from the first image.

4. The semiconductor inspection apparatus according to claim 1, further comprising a fifth calculator calculating a length of the first narrow width portion in the first direction from the first image.

5. A semiconductor device inspection method comprising:

capturing a first image of a first lead of a semiconductor package, the semiconductor package including: a sealing portion having an upper surface, a lower surface, a first side surface, and a second side surface facing the first side surface, the sealing portion sealing a semiconductor chip; and a first lead extending from the first side surface of the sealing portion in a first direction, the first lead having a first wide width portion and a first narrow width portion, the first wide width portion being located between the first side surface and the first narrow width portion;

calculating a first area of a first notch region located on one side of the first narrow width portion of the first lead and a second area of a second notch region located on the other side of the first narrow width portion from the first image; and calculating a ratio of the first area and the second area.

6. The semiconductor device inspection method according to claim 5, wherein the semiconductor package includes a second lead extending from the second side surface of the sealing portion in a direction opposite to the first direction, and the second lead has a second wide width portion and a second narrow width portion, and the second wide width portion is located between the second side surface and the second narrow width portion, and wherein the semiconductor device inspection method further comprising:

capturing a second image of the second lead;

calculating a third area of a third notch region located on one side of the second narrow width portion of the second lead and a fourth area of a fourth notch region located on the other side of the second narrow width portion from the second image; and calculating a first sum of the first area and the second area and a second sum of the third area and the fourth area and calculating a ratio of the first sum and the second sum.

7. The semiconductor device inspection method according to claim 5, wherein a first width of the first wide width portion and a second width of the first narrow width portion are calculated from the first image.

8. The semiconductor device inspection method according to claim 5, wherein a length of the first narrow width portion in the first direction is calculated from the first image.

* * * * *